United States Patent
Binding et al.

(10) Patent No.: US 7,636,786 B2
(45) Date of Patent: Dec. 22, 2009

(54) FACILITATING ACCESS TO A RESOURCE OF AN ON-LINE SERVICE

(75) Inventors: Carl Binding, Rueschlikon (CH); Daniela Bourges-Waldegg, Adliswil (CH); Stefan G. Hild, Adliswil (CH)

(73) Assignee: International Business Machines Corporation, Armonk, NY (US)

( * ) Notice: Subject to any disclaimer, the term of this patent is extended or adjusted under 35 U.S.C. 154(b) by 789 days.

(21) Appl. No.: 10/465,114

(22) Filed: Jun. 19, 2003

(65) Prior Publication Data
US 2004/0260817 A1 Dec. 23, 2004

(51) Int. Cl.
G06F 15/16 (2006.01)
G06F 3/00 (2006.01)

(52) U.S. Cl. ............... 709/229; 709/203; 709/217; 709/219; 715/744; 715/747

(58) Field of Classification Search ......... 709/203, 709/217, 219, 229; 715/744, 747, 513
See application file for complete search history.

(56) References Cited

U.S. PATENT DOCUMENTS

| | | | | |
|---|---|---|---|---|
| 6,128,663 | A * | 10/2000 | Thomas ............... | 709/228 |
| 6,199,077 | B1 * | 3/2001 | Inala et al. ............. | 715/501.1 |
| 6,510,451 | B2 * | 1/2003 | Wu et al. .............. | 709/203 |
| 6,517,587 | B2 * | 2/2003 | Satyavolu et al. ...... | 715/501.1 |
| 2002/0024536 | A1 * | 2/2002 | Kahan et al. ........... | 345/745 |
| 2002/0046299 | A1 * | 4/2002 | Lefeber et al. ......... | 709/318 |
| 2002/0052954 | A1 * | 5/2002 | Polizzi et al. ......... | 709/225 |
| 2003/0105854 | A1 * | 6/2003 | Thorsteinsson et al. .. | 709/223 |
| 2003/0163547 | A1 * | 8/2003 | Beisty et al. .......... | 709/217 |

FOREIGN PATENT DOCUMENTS

EP 0 848 338 A1 6/1998

OTHER PUBLICATIONS

Ling Liu et al. "Conquer: A Continual Query System for Update Monitoring in the WWW". Computer Systems Science and Engineering, Surrey, GB. vol. 14, No. 2. Mar. 1999.*

* cited by examiner

Primary Examiner—Philip J Chea
(74) Attorney, Agent, or Firm—Michael J. Buchenhorner; Vazken Alexanian

(57) ABSTRACT

Methods, systems and apparatus for facilitating access by a user to a resource of an on-line service via a data communications network, the resource being accessible via an entry page of the service. A method includes checking whether a user condition, prestored in the network, is satisfied, the user condition being associated with the user and relating to the resource. If the condition is not satisfied, the entry page is sent to the user via the network. If the condition is satisfied, the entry page is modified by adding an indication relating to the resource. The modified entry page in then sent to the user advantageously, the method also includes transmitting to the user a notification message in response to, and indicative of, the condition being satisfied.

17 Claims, 12 Drawing Sheets

10   WIRED DEVICE

20   SERVER COMPUTER SYSTEM

30   WIRED DATA COMMUNICATION NETWORK

- 40 CPU
- 50 A DISPLAY
- 60 USER INPUT
- 70 NETWORK ADAPTER
- 80 MEMORY
- 90 BUS ARCHITECTURE
- 100 COMPUTER PROGRAM CODE
- 110 BROWSER

| | | | | |
|---|---|---|---|---|
| 20 | A SERVER COMPUTER SYSTEM | | 200 | HTML PAGE |
| 120 | CPU | | 210 | HTML PAGE |
| 130 | DISPLAY | | 220 | HTML PAGE |
| 140 | USER INPUT | | 230 | HTML PAGE |
| 150 | NETWORK ADAPTER | | 240 | HTML PAGE |
| 160 | MEMORY | | 250 | HTML PAGE |
| 170 | BUS SYSTEM | | 260 | WEB SITE |
| 180 | PROGRAM CODE | | | |
| 190 | USER ACCESS SUBSYSTEM | | | |

| | | | |
|---|---|---|---|
| 200 | HTML PAGE | 250 | HTML PAGE |
| 210 | HTML PAGE | 270 | HYPERTEXT LINK |
| 220 | HTML PAGE | 280 | HYPERTEXT LINK |
| 230 | HTML PAGE | 300 | HYPERTEXT LINK |
| 240 | HTML PAGE | 310 | HYPERTEXT LINK |

190  USER ACCESS SUBSYSTEM

315  IDENTIFIER

320  PORTAL

330  CONDITION STORE

340  COMPARATOR

350  MESSAGE GENERATOR

360  PAGE MODIFIER

| | |
|---|---|
| 365 | RECEIVE REQUEST |
| 370 | ENABLE RECORDATION |
| 375 | IS IDENTIFIER RECOGNIZED |
| 380 | CHECK CONDITION |
| 385 | GRANT ACCESS |
| 390 | IS CONDITIONED SATISFIED? |
| 395 | SEND INVITATION TO REGISTER |
| 400 | ADD REFERENCE |
| 410 | SEND NOTIFICATION? |
| 420 | GENERATE MESSAGE |
| 430 | RESPONSE RECEIVED? |
| 440 | RESET PAGE |

200 HTML PAGE           280 HYPERTEXT LINK

210 HTML PAGE           290 HYPERTEXT LINK

220 HTML PAGE           300 HYPERTEXT LINK

230 HTML PAGE           310 HYPERTEXT LINK

240 HTML PAGE           450 HYPERTEXT LINK

250 HTML PAGE

270 HYPERTEXT LINK

| | | | | |
|---|---|---|---|---|
| 200 | HTML PAGE | | 290 | HYPERTEXT LINK |
| 210 | HTML PAGE | | 300 | HYPERTEXT LINK |
| 220 | HTML PAGE | | 310 | HYPERTEXT LINK |
| 230 | HTML PAGE | | 450 | HYPERTEXT LINK |
| 240 | HTML PAGE | | 460 | HYPERTEXT LINK |
| 250 | HTML PAGE | | 470 | HYPERTEXT LINK |
| 270 | HYPERTEXT LINK | | | |
| 280 | HYPERTEXT LINK | | | |

| | | | |
|---|---|---|---|
| 200 | HTML PAGE | 300 | HYPERTEXT LINK |
| 210 | HTML PAGE | 310 | HYPERTEXT LINK |
| 220 | HTML PAGE | 490 | HYPERTEXT LINK |
| 230 | HTML PAGE | 500 | HYPERTEXT LINK |
| 240 | HTML PAGE | 510 | HYPERTEXT LINK |
| 250 | HTML PAGE | 520 | HYPERTEXT LINK |
| 270 | HYPERTEXT LINK | | |
| 280 | HYPERTEXT LINK | | |
| 290 | HYPERTEXT LINK | | |

530  WIRELESS USER ACCESS DEVICE

540  COMMUNICATION NETWORK

550  SERVER SYSTEM

560 ACCESS DEVICE

570 WIRELESS DEVICE

580 HYBRID DATA COMMUNICATIONS NETWORK

590 SERVER COMPUTER SYSTEM

| | |
|---|---|
| 200 | HTML PAGE |
| 210 | HTML PAGE |
| 220 | HTML PAGE |
| 230 | HTML PAGE |
| 240 | HTML PAGE |
| 260 | HYPERTEXT LINK |
| 270 | HYPERTEXT LINK |
| 280 | HYPERTEXT LINK |
| 290 | HYPERTEXT LINK |
| 300 | HYPERTEXT LINK |
| 310 | HYPERTEXT LINK |
| 600 | RESOURCE |

FACILITATING ACCESS TO A RESOURCE OF AN ON-LINE SERVICE

FIELD OF INVENTION

The present invention is directed to facilitating access by a user, to a resource of an on-line service via a data communications network. The resource being accessible via an entry page of the service.

BACKGROUND OF THE INVENTION

Service organizations such as financial institutions and airlines are increasingly providing information relating to services to existing and potential customers via public access wide area data communications networks such as the so-called World Wide Web (WWW) or Internet. Typically, such information is stored in a server computer system operated by or for the corresponding service organization. The server computer system typically comprises a single server computer, or a cluster of server computers interconnected via a local area network, coupled to the network via a gateway. The information is typically stored in the server computer system in a markup language such as Hypertext Markup Language (HTML) format or Wireless Markup Language (WML) format, or stored in a database and dynamically rendered in such markup languages.

In HTML format, the information is typically stored in the form of a plurality of pages. A Universal Resource Locator (URL) is associated with each page. A particular page of information can be accessed by entering the corresponding URL into HTML browser software executing on a device connected to the network. The browser retrieves from the server system the page corresponding to the URL entered into the browser. The page is transmitted from the server system to the user device via the network. The browser then displays the retrieved page on the device. Each page may contain one or more hypertext links to other pages of information. The browser can be instructed to retrieve one of these other pages by selecting the corresponding links. Hypertext links permit the information to be arranged into a hierarchical structure comprising an entry point or home page and plurality of subsidiary pages accessible from the home page via one or a series of hypertext links. The hierarchical structure is also referred to as a domain or web site.

HTML is conventionally employed to communicate service information over wired network connections. However, as data processing power in portable communications devices such as mobile telephones increases, there is a growing demand for communication of similar information over wireless network connections. In response to the growing demand for such wireless communications, a new wireless communications protocol known as the Wireless Application Protocol (WAP) was devised by the WAP Forum.

WML is a mark up language employed in WAP communications systems for communicating information to WAP compliant mobile user devices. A WAP compliant user device comprises WAP browser displaying WML format information received from a WAP server. Many mobile telephones now include WAP browsers. The WML format information is displayed on such user access devices in the form of a deck of cards, where each card represents one screen full of information. It is for performance issues that WML cards are batched into a deck of cards before being transmitted over WAP's Wireless Session Protocol (WSP). WML cards can be generally regarded as analogous to HTML pages. It is now common for WWW server computer systems to include a transcoder for converting a HTML pages into WML format for transmission to a wireless mobile user devices. By way of an alternative to transcoding HTML content into WML, WWW servers can also be used to store WML content or to dynamically generate WML mark-up language from data stored in some data repository such as a file system or a database."

Increasingly, service organizations are extending the content of their web sites to provide on-line services to users. Such on-line services typically offer a range of resources to a user. For example, many airlines now provide users with on-line resources to book flights, check seat availability, and make purchases through a frequent flyer program. Likewise, many banks and financial institutions now provide users with on-line resources to perform financial transactions, and trade stocks and shares. A user typically registers with such a service organization to gain access to its on-line services. Upon registration, each user is issued a personal identification code such as a personal identification number or password by the service organization. A login panel accessible from the home page of the service organization then provides the user with access to the on-line resources on entry of the corresponding personal identification code. Some service organizations are now providing registered customers with so-called "web portals" through which users may record preferences relating to services on offer.

Many on-line resources are accessible only be navigating from a home page or login panel through a series of unwanted intermediate pages, all interconnected by a path of hypertext links. This frequently makes such resources difficult to find on a web site. Also, whilst the intermediate pages may provide the service organization with an opportunity to provide additional information to its users as they navigate through the web site to the desired on-line resource, it is time-consuming for the customers, particularly if they are seeking to access the resource at a time when the network is congested and therefore sluggish in performing data transmissions. It would therefore be desirable to provide direct access to such resources in the event that specific conditions are met, thereby avoiding time consuming navigation through intermediate pages of information.

SUMMARY OF THE INVENTION

Therefore, the present invention provides methods for facilitating access by a user, via a data communications network, to a resource of an on-line service The resource being accessible via an entry page of the service. In an example embodiment, method comprising: checking whether a user condition, prestored in the network, is satisfied [the user condition is associated with the user and relates to the resource]; identifying the user from a service access request submitted by the user over the network; if the condition is not satisfied, sending the entry page to the user via the network; and, if the condition is satisfied, modifying the entry page by adding an indication relating to the resource and sending the modified entry page to the user.

The service, together with the entry page, the modified entry page, and the resource of the service, may be implemented in a mark up language, such as HTML or WML for communication to a browser on a user device such as a personal computer or mobile telephone. In some embodiments of the present invention, the condition is implemented in a computer program stored on a server computer system within the network.

Viewing the present invention from another aspect, there is now provided apparatus for facilitating access by a user, via a data communications network, to a resource of an on-line service, the resource being accessible via an entry page of the service, the apparatus comprising: a comparator for determining whether a user condition, prestored in the network, is satisfied, the user condition being associated with the user and relating to the resource; an identifier identifying the user from a service access request submitted by the user over the network; a page modifier connected to the comparator for modifying the entry page by adding an indication relating to the resource if the condition is satisfied; and a network adapter connected to the comparator for sending one of the entry page and the modified entry page to the user based on the determination by the comparator.

Advantageous embodiments of the present invention further include a message generator connected to the comparator for transmitting to the user a notification message in response to, and indicative of, the condition being satisfied. Particular embodiments of the present invention also include a condition store for storing the condition in the network.

BRIEF DESCRIPTION OF THE DRAWINGS

These and other aspects, features, and advantages of the present invention will become apparent upon further consideration of the following detailed description, by way of example only, of the invention when read in conjunction with the drawing figures, in which.

DETAILED DESCRIPTION OF THE INVENTION

Figure 1:
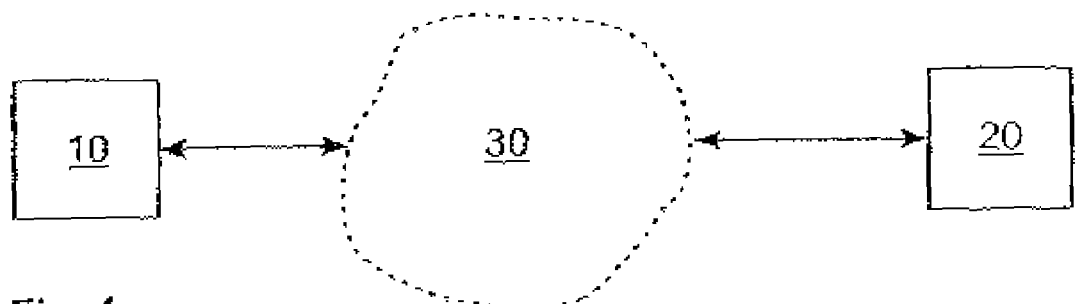
FIG. 1 is a block diagram of a data communications network.

The present invention provides methods, apparatus and systems for facilitating access by a user, via a data communications network, to a resource of an on-line service, the resource being accessible via an entry page of the service. In an embodiment, the method includes: checking whether a user condition, prestored in the network, is satisfied, [the user condition being associated with the user and relating to the resource]; identifying the user from a service access request submitted by the user over the network; if the condition is not satisfied, sending the entry page to the user via the network; and, if the condition is satisfied, modifying the entry page by adding an indication relating to the resource and sending the modified entry page to the user.

The service, together with the entry page, the modified entry page, and the resource of the service, may be implemented in a mark up language, such as HTML or WML for communication to a browser on a user device such as a personal computer or mobile telephone. In advantageous embodiments of the present invention, the condition is implemented in a computer program stored on a server computer system within the network.

The indication relating to the resource may comprise the resource itself. Alternatively, the indication relating to the resource may comprise a link to the resource with appropriate parameters. By adding such an indication to the entry page, the user is provided with access to the resource without requiring a prolonged navigation from an entry page of a web site to the desired page via intermediate pages. This is especially useful where the device on which the user's access device has limited display capabilities and is connected to the application server via a low bandwidth, high latency wireless communications network. Examples of such devices include mobile computing devices such as personal digital assistants and communicators.

A particular example of a method embodying the present invention includes transmitting to the user a notification message in response to, and indicative of, the condition being satisfied. The user is thus alerted by the notification message when the condition is satisfied. This is particularly desirable in relation to services associated with dynamic markets such as stock trading services and travel booking services. For example, the condition may be set to trigger modification of a user's entry page to the web site of a commodity trading service and transmission of a corresponding notification message to the user when the value of a particular stock or other commodity rises above or drops below a predefined level. In another example, the condition may be set to trigger modification of a user's entry to the web site of an airline and transmission of a corresponding notification message to the user in the event that a specified category of airline seating becomes available on a specified route flown by the airline. The notification may be delivered to the user in the form of electronic mail via a wired network connection to the user device. In an alternative embodiment of the present invention, the notification may be delivered to a mobile telephone registered to the user in the form of, for example, a Short Message Service (SMS) message. In response to the notification, the user can request access to the service. On connection to the service, the user is sent the modified entry page in place of the standard entry page (e.g.: home page).

The modified entry page contains an additional indication relating to the resource. The additional indication enables the user to navigate directly to the resource associated with the satisfied condition, preferably via a minimal action, such as a single click on a control button of a mouse or similar pointing device. Any transactions now deemed appropriate in view of the condition being met, such as buying and selling commodities or booking travel tickets, can then be performed by the user without involving transmission of undesired information from the web site of the service organization.

An especially advantageous example of a method embodying the present invention includes storing the condition in the network. For example, in the interests of convenience, the user may be provided with a facility for entering a particular condition or group of conditions via a web-based configuration environment such as a web portal.

An embodiment of the present invention to be described shortly includes steps of: checking whether any one of a plurality of user conditions prestored in the network is satisfied, each of the conditions being associated with a different resource accessible via the entry page of the service; if none of the conditions are satisfied, sending the entry page to the user via the network; and, if one or more of the conditions are satisfied, modifying the entry page by adding an indication relating to the corresponding resource and sending the modified entry page to the user. The indication may include the corresponding resource. Alternatively, the indication may include a link to the corresponding resource. A particular embodiment of the present invention include transmitting to the user a notification message in response to, and indicative of, the condition being satisfied. Preferably, the condition is stored in the network.

The present invention extends to a computer program element comprising computer program code means which, when loaded in a processor of a server computer system for connection to a data communications network, configures the processor to perform a method as hereinbefore described.

The present invention also extends to a server computer system comprising: a processor; a memory; a network adapter for connecting the server system to a data communications network; a bus subsystem interconnecting the central processor unit; and a computer program element as described in the preceding paragraph stored in the memory.

Viewing the present invention from another aspect, there is now provided apparatus for facilitating access by a user, via a data communications network, to a resource of an on-line service, the resource being accessible via an entry page of the service, the apparatus comprising: a comparator for determining whether a user condition, prestored in the network, is satisfied, the user condition being associated with the user and relating to the resource; an identifier identifying the user from a service access request submitted by the user over the network; a page modifier connected to the comparator for modifying the entry page by adding an indication relating to the resource if the condition is satisfied; and a network adapter connected to the comparator for sending one of the entry page and the modified entry page to the user based on the determination by the comparator. Advantageous embodiments of the present invention further include a message generator connected to the comparator for transmitting to the user a notification message in response to, and indicative of, the condition being satisfied. Particularly advantageous embodiments of the present invention also include a condition store for storing the condition in the network.

Referring first to FIG. 1, an advantageous embodiment of the present invention comprises a user access device 10 remotely connectable to a server computer system 20 of a service organization via a wired data communication network 30.

Figure 2:
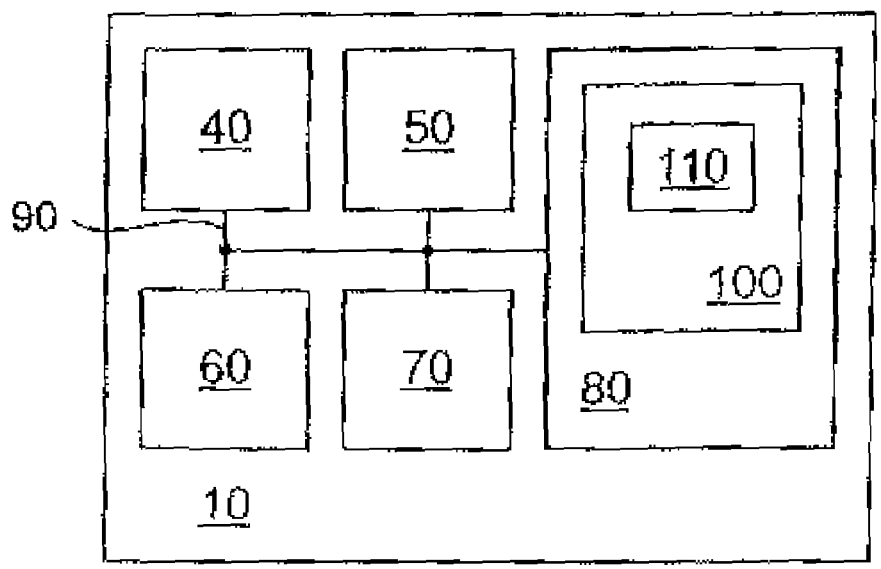
FIG. 2 is a block diagram of a user access device.

With reference now to FIG. 2, the user access device 10 comprises a central processing unit (CPU) 40, a memory 80, a display 50, a user input 60 including a keyboard and a cursor pointing device such as a mouse or tracker ball, and a network adapter 70, all interconnected by a bus architecture 90. Computer program code 100 is stored in the memory 80 for instructing the CPU 40 to perform various tasks. The network adapter 70 provides a connection to the data communication network 30 for receipt and transmission of data to and from other devices connected to the network such as the server computer system 20. For example, the network adapter 70 may be implemented by a modem. The user input 60 enables the user to interact with the CPU 40 in the selection of tasks to be performed based on the computer program code 100 stored in the memory 80. The computer program code 100 comprises a browser 110 for adapting information received from the server computer system 20 for presentation on the display 50.

Figure 3:
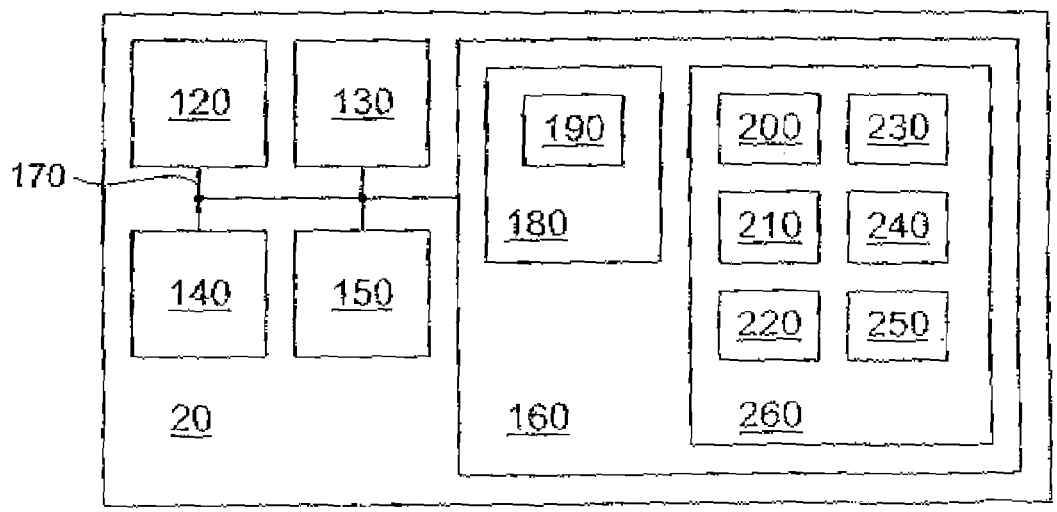
FIG. 3 is a block diagram of a server computer system.

Referring to FIG. 3, the server computer system 20 also comprises a CPU 120, a memory 160, a display 130, a user input 140 including a keyboard and a cursor point device, and a network adapter 150, all interconnected by a bus subsystem 170. Computer program code 180 is stored in the memory 160 for instructing the CPU 120 to perform various tasks. The network adapter 150 provides a connection to the data communication network 30 for receipt and transmission of data to and from other devices connected to the network such as the user access device 10. For example, the network adapter 150 may be implemented by a remote access server permitting multiple users to access the server system 20 simultaneously. The user input 60 enables interaction with the CPU 120 in the selection of tasks to be performed based on the computer program code 180 stored in the memory 80. The computer program code 100 comprises user access subsystem 190. Also stored in the memory 160 is a web site 260 of the service organization. In operation, the user access subsystem 190 controls access to the web site 260 by a user. The user access subsystem 190, and operation thereof, will be described in detail shortly. The web site 260 comprises a plurality of HTML pages 200-250. The server computer system 20 may be implemented by a single server computer or by a cluster of server computers interconnected via a local area network.

Figure 4:
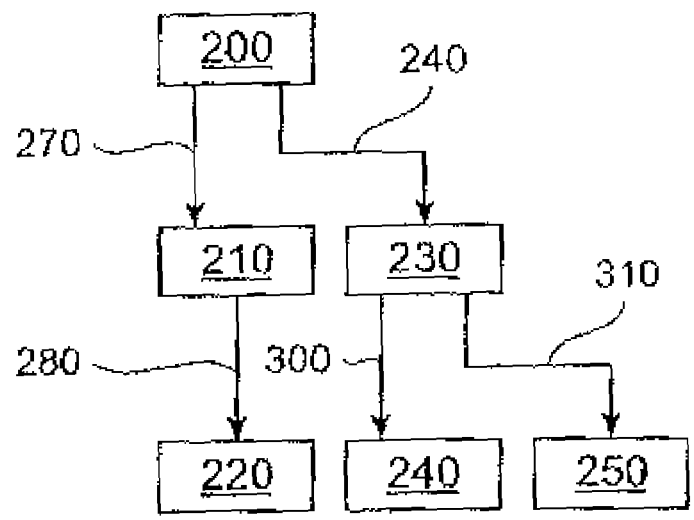
FIG. 4 is a block diagram of a web site stored on the server computer system.

With reference to FIG. 4, the pages 200-250 comprise a user's entry page 200 and a plurality of subsidiary pages 210-250 linked by a hypertext links 270-310 to the entry page 200 to form a hierarchical structure. Each hypertext link is implemented by including a URL of one of the pages 200-250, such as page 240, in another one of the pages 200-250, such as page 240. For example, the pages 240 and 250 are reached from the entry page 200 by initially following the hypertext link 290 to an intermediate page 230.

In operation, to access the web site 260, the user first connects the user device 10 to the data communications network 30. The user then issues a service access request for access to the web site 260 to the server system 20 via the browser 110. The service access request identifies the user to the server system 20. In a particularly advantageous embodiment of the present invention, the service access request may be initiated by entering a user identification password into a logon page supplied to the browser 110 from the web site 260 in response to entry of a URL corresponding to the web site 260 into the browser 110. On receipt of the registered password, the server system 20 sends the entry page 200 to the user access device 10 for display by the browser 110. Processing of the service access request is performed by the user access subsystem 190 in the server system 20.

Suppose that page 220 contains a resource required by the user. Conventionally, to reach page 220, and the resource therein, from the entry page 200, the user has first to follow link 270 to the intervening page 210, before accessing page 220 via link 280. This is clearly inconvenient.

Figure 5:
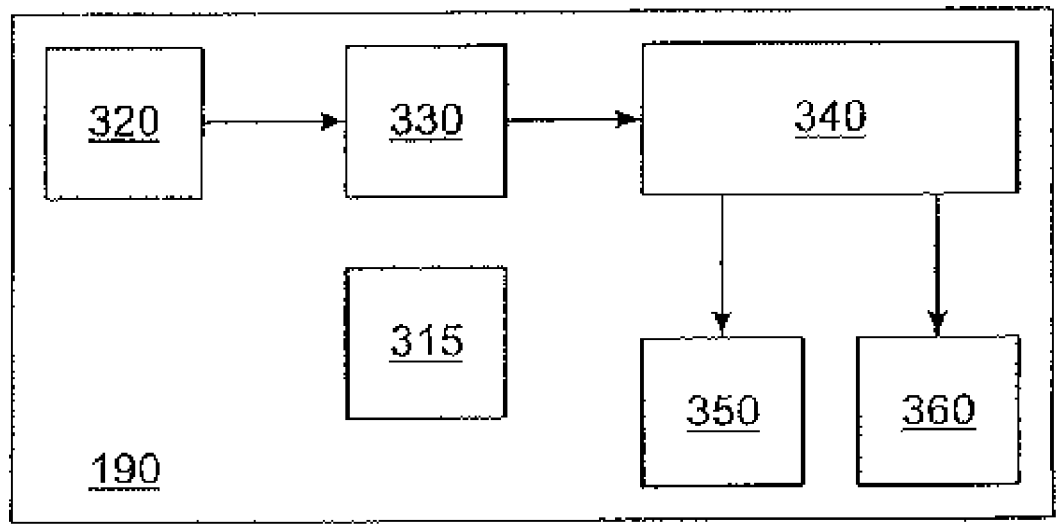
FIG. 5 is a block diagram of an example of a user access subsystem of the server computer system.

Referring now to FIG. 5, the user access subsystem 190 comprises an identifier 315 and a portal 320. The portal 320 is connected to a condition store 330. A comparator 340 has an input connected to the condition store 330. One output of the comparator 340 is connected to a message generator 350. Another output of the comparator 340 is connected to a page modifier 360. In particularly advantageous embodiments of the present invention, the portal 320, condition store 330, comparator 340, message generator 350, and page modifier of the user access subsystem 190 are at least partially embodied in computer program code routines.

Figure 6:
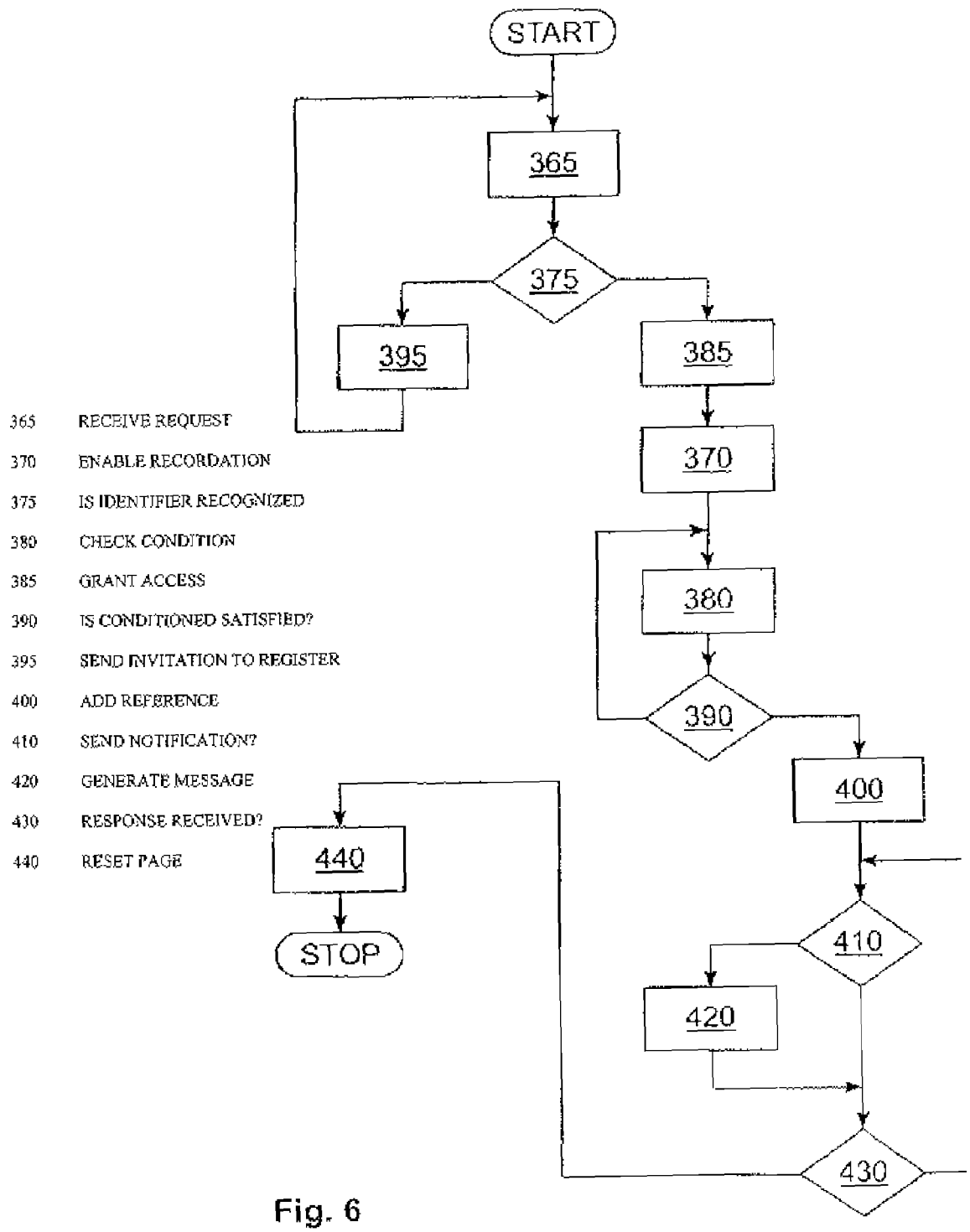
FIG. 6 is a flow diagram of a user access subsystem in operation.

Operation of the user access subsystem 190 will now be described with reference to FIG. 6. At step 365, a service access request is received by the identifier 315. If, at step 375, the identifier 315 recognizes the user specified in the service access request, the user is granted access to the web site 260 at step 385. Otherwise, at step 395, the user is sent an invitation to register for access to the web site 260. At step 370, the portal 320 enables the user to record in the condition store 330 via the user device 10 a condition associated with a resource contained in the web site 260. In response to storage of a condition in the condition store 330 in step 370, the comparator 340 periodically performs a check, at step 380 to determine if the condition is satisfied. If such a check reveals that the condition is satisfied at step 390, the comparator 340 instructs the page modifier 350 to add, at step 400, a reference to the resource associated with the condition to the entry page 200 to be sent to the user. If the check at step 380 indicates that the condition is not satisfied, then, at step 390, the operation of the user access subsystem 190 loops back to the check at step 380. Following addition of the reference to the resource to the user's entry page 200 at step 400, a test is performed, at step 410, to determine if the user is due to be sent a notification to the effect that the condition has been met. If the user is due such a message, then at step 420, the comparator 340 instructs the message generator 350 to generate a message, addressed to the user device 10, to indicate that the condition has been met. The message is dispatched to the user device 10 in the form of electronic mail over the wired network 30. If, at step 410, it is determined that a notification is not due, then, at step 430, a test is performed to determine if a response from the user has been received. If, at step 430, a response from the user has been received, then, at step 440, the user's entry page 200 is reset by removing the reference to the resource added at step 400. If, at step 430, a response from the user has yet to be received, then the test to determine if a notification to the user is due is repeated at step 410. When the condition is first met, the test at step 410 indicates that notification to the user is due and the message generator 350 is instructed accordingly. Subsequently, the test at step 410 may be set up to instruct the issuance of reminders according to any one or more of a range of different parameters. For example, in particularly advantageous embodiments of the present invention, the web portal 320 enables the user to record in the condition 330 a personal preference for issuance of reminders from the message generator 350. For example, the user may record a desire to be reminded on a daily basis that a particular condition has been met. Alternatively, the user may only require such a reminder on a weekly basis. It will be appreciated that the test 410 may be thus programmed to issue reminders within a range of frequencies according to user preference. In some embodiments of the present invention, the reminder frequency may be preset, for example, by the service organization.

Figure 7:
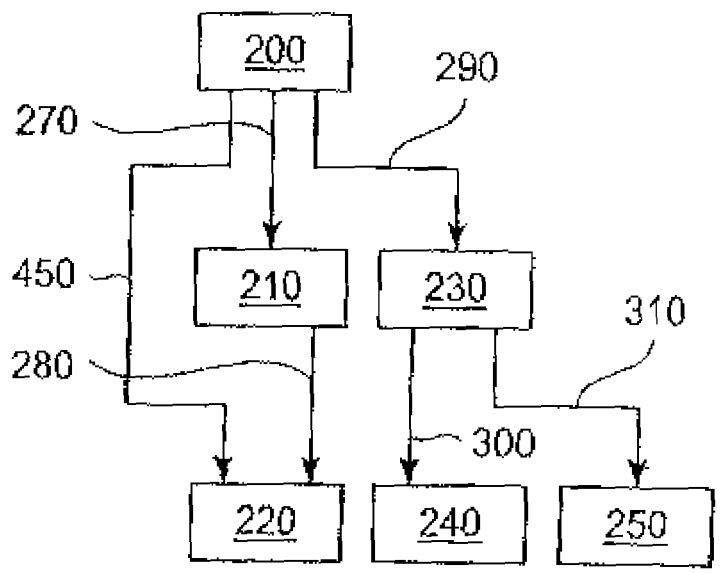
FIG. 7 is another block diagram of the web site stored on the server system.

Referring now to FIG. 7, in an embodiment of the present invention, the reference to the resource added to the user's entry page 200 includes a hypertext link 450 to the page of the web site 260 carrying the resource. For example, suppose that page 220 contains the resource to which the condition relates. When the condition is satisfied, the page modifier 360 adds to the user's entry page 200 the hypertext link 450 to page 220. The user can now follow the hypertext link 450 from the modified entry page 200 received directly to page 220 without having to initially access page 210.

Figure 8:
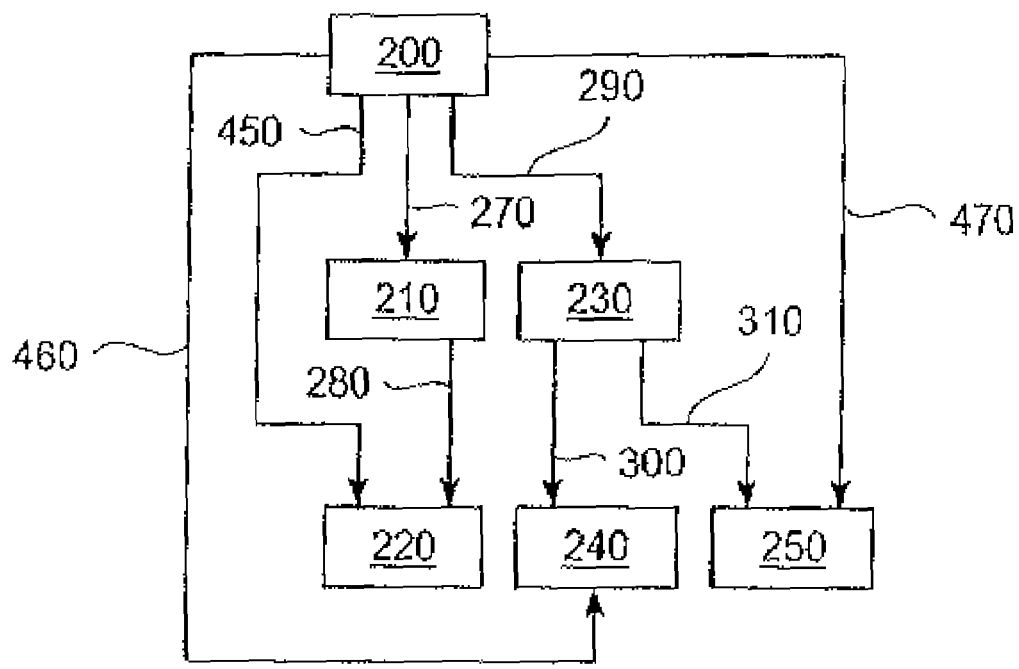
FIG. 8 is yet another block diagram of the web site stored on the server system.
Figure 9:
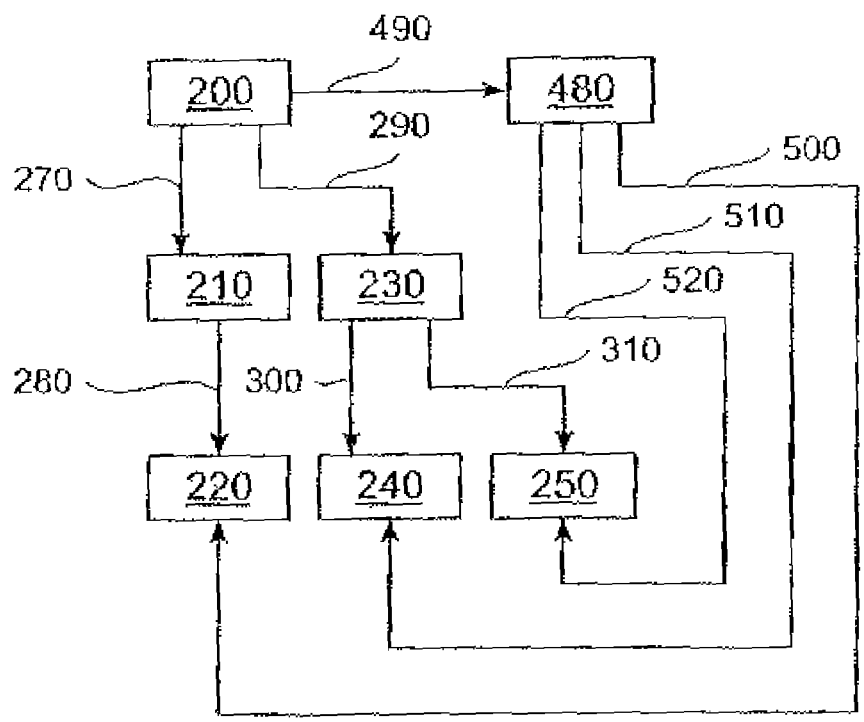
FIG. 9 is a further block diagram of the web site stored on the server system.

Referring back to FIG. 6, in another embodiment of the present invention, the portal 320 enables, at step 370, the user to record, via the user device 10, multiple conditions, each corresponding to different resource contained in the web site 260, in the condition store 330. Steps 380 and 390 are performed for each condition stored. If the check at step 380 indicates that a stored condition is satisfied, then a reference to the corresponding resource is added to the user's entry page 200. Steps 410 to 440 are then performed for each reference added. With reference to FIG. 8, in an advantageous example of this arrangement, each reference to a resource added to the user's entry page 200 each includes a hypertext link, such as hypertext link 450, to the page of the web site 260 carrying the resource. For example, suppose that pages 220, 240, and 250 each contain a resource to which a stored condition relates. With all three stored conditions satisfied, the user's entry page 200 contains hypertext links 450-470 to pages 220, 240, and 250; each of hypertext links 450. The user can now follow the hypertext link 450-470 having been added to the user's entry page 200 by the page modifier 360. The user can now follow the hypertext links 450-470 from the entry page 200 directly to pages 220, 240 and 250 without having to initially access intermediate pages 210 and 230. Referring to FIG. 9, in a modification to the advantageous embodiment of the present invention hereinbefore described with reference to FIG. 8, hypertext links 500-520 to pages 220, 240 and 250 are added to an additional page 480 by the page modifier 350 in response to the comparator detecting that corresponding condition stored in the condition stores 330 have been met. The page modifier 350 also modifies the user's entry page 200 by adding a hypertext link 490 to the additional page 480.

Figure 10:
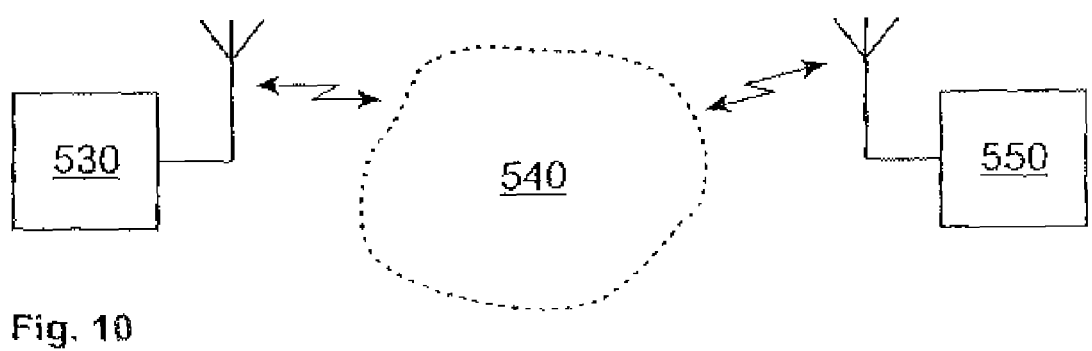
FIG. 10 is a block diagram of a wireless data communications network.

Referring now to FIG. 10, another embodiment of the present invention comprises a wireless user access device 530 remotely connectable to a server computer system 550 of a service organization via a wireless data communication network 540. The wireless device 530 comprises similar components to those of the wired user access device 10 herein before described with reference to FIG. 2. However, it will be appreciated that the network adapter of the wireless user access device 530 comprises an antenna for effecting wireless communications with the remote server system 550. Likewise, the server system 550 comprises similar components to the system 30 herein before described with reference to FIG. 3. However, it will again be appreciated that the network adapter of the server system 550 comprises an antenna for effecting wireless communication with user access device 10. The wireless user access device 530, the wireless communication network 540, and the server system 550 collectively operate substantially as hereinbefore described with reference to FIGS. 1 to 9. However, in some advantageous embodiments of the present invention, communication of information between the server system 550 and the wireless user device 530 may be effecting in accordance with the aforementioned Wireless Application Protocol, with the information encoded in WML instead of HTML. Also, notifications and messages communicated between the wireless user access device 530 and the server system 550 may be encoded as Short Message Service (SMS) messages or the like.

Figure 11:
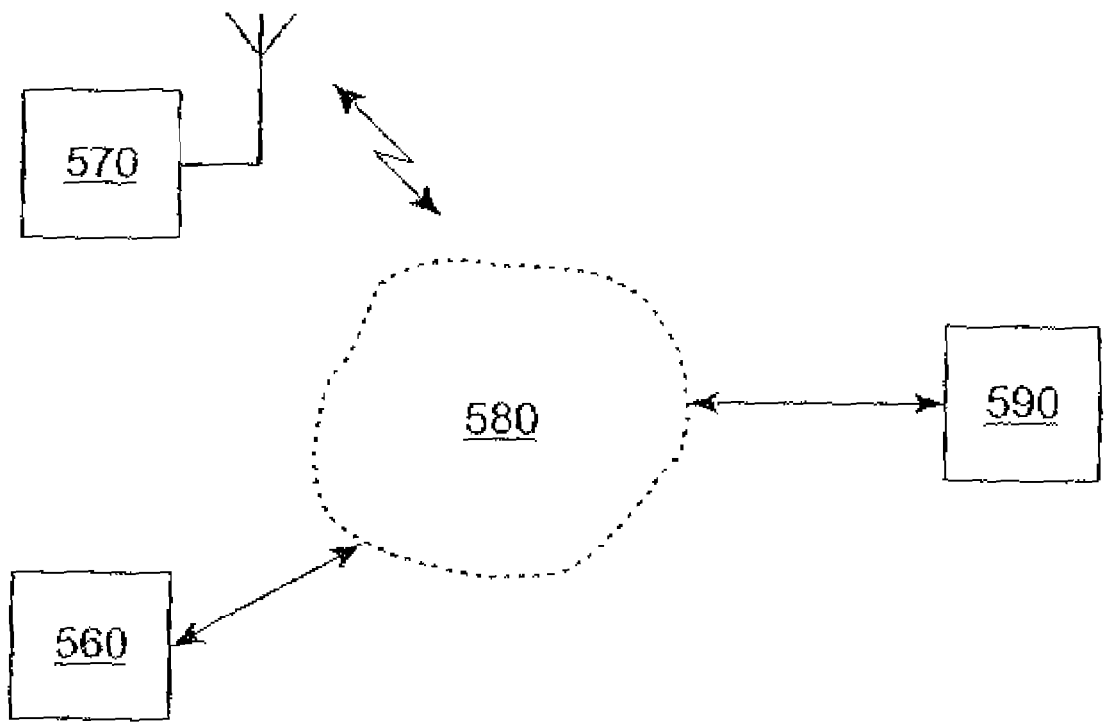
FIG. 11 is a block diagram of a hybrid data communications network.

With reference to FIG. 11, yet another embodiment of the present invention comprises a hybrid data communications network 580 for connecting a wired user access device 560 and a wireless user access device 570 to a server computer system 590 of a service organization. The wireless device 57 comprises similar components to those of the wireless device 530 herein before described with reference to FIG. 10. The wired device 560 comprises similar components to those of the wired device 10 herein before described with reference to FIG. 2. The server system 590 comprises similar components to the system 30 herein before described with reference to FIG. 3. The hybrid network 580 comprises a wireless portion for effecting communications between the server system 590 and the wireless device 570 and a wired portion for effecting communications between the server system 590 and the wired device 560. In operation, the server system 550 cooperates with the wired device 560 or, depending on user preference, the wireless device 570 substantially as hereinbefore described with reference to FIGS. 1 to 9. However, the user may opt to receive information from the server system 590 routed to the wired device 560 and notifications relating to the information routed from the server system 590 to the wireless device 560. Alternatively the user may choose to receive information from the server system 590 routed to the wireless device 560 and notifications relating to the information routed from the server system 590 to the wired device 560.

In the embodiments of the present invention hereinbefore described, a web portal 320 permits the user to set the 'or each' condition stored by the user access subsystem 190 according to personal preference. However, different web-based configuration environments may employed in other embodiments of the present invention. It should also be appreciated that, in some embodiments of the present invention, the 'or each' condition may be set by the service organization instead of the user.

Figure 12:
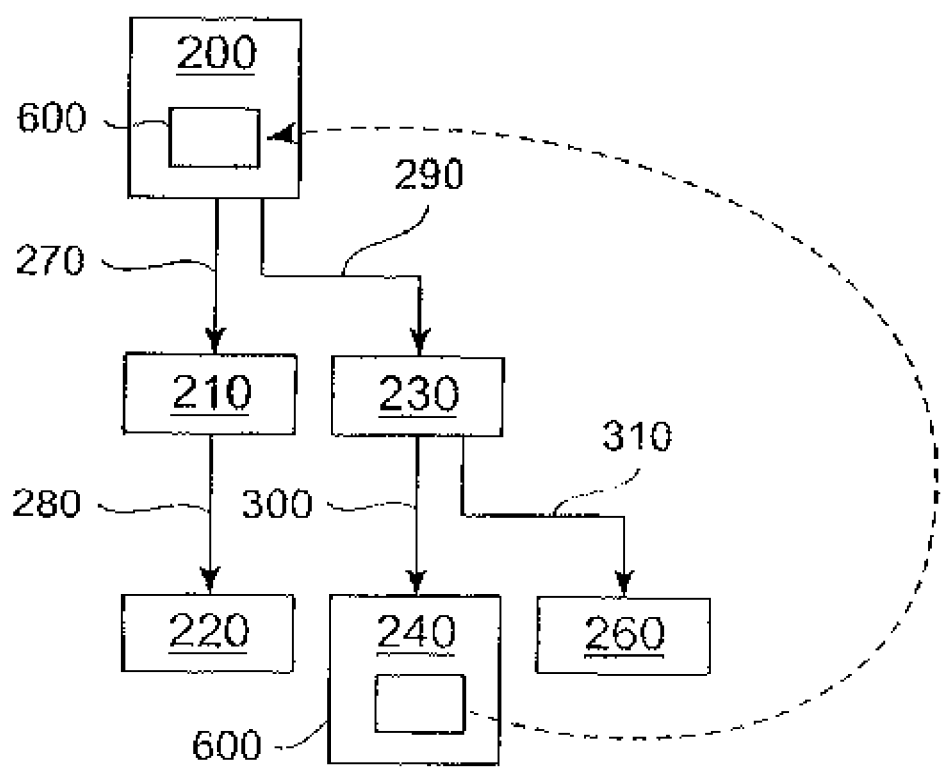
FIG. 12 is a further diagram of the web site stored on the server system.

In the advantageous embodiments of the present invention herein before described, the page modifier 350 modifies the user's entry page 200 by adding an indication relating to the resource in the form of a link. However, in other embodiments of the present invention, the page modifier 350 may modify the user's entry page by adding the resource itself. For example, referring to FIG. 12, suppose that page 240 contains a resource 600 top which a condition recorded in the condition store 330. The resource 600 may be implemented, for example, in the form of a small piece of downloadable program code such as a Java applet. When the stored condition is satisfied, the page modifier 350 copies the resource 600 into the entry page 200. It will appreciated that, in other embodiments of the present invention, the resource may be moved rather than copied from one page to another. It will also be appreciated that, in some embodiments of the present invention, the resource may be dynamically constructed within the entry page 200 in response to a stored condition being satisfied.

Several embodiments of the present invention have been hereinbefore described with reference to a user device comprising a browser 110 for adapting information received from the server computer system 20 for presentation on a display. However, it will be appreciated that the present invention is equally applicable to user devices including other user interface technologies.

As used herein, the phrase, 'the or each' includes: at least one; one or more; one specific or all; one or every; and one or all. Also, 'the or each' is used in the context where it is desirable to integrate both singular and plural forms into a sentence or phrase. For example, the resource may be supplied in response to one or more conditions being met; 'the or each' condition being associated with a user requesting the resource.

Variations described for the present invention can be realized in any combination desirable for each particular application. Thus particular limitations, and/or embodiment enhancements described herein, which may have particular advantages to the particular application need not be used for all applications. Also, not all limitations need be implemented in methods, systems and/or apparatus including one or more concepts of the present invention.

The present invention can be realized in hardware, software, or a combination of hardware and software. A visualization tool according to the present invention can be realized in a centralized fashion in one computer system, or in a distributed fashion where different elements are spread across several interconnected computer systems. Any kind of computer system—or other apparatus adapted for carrying out the methods and/or functions described herein—is suitable. A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which—when loaded in a computer system—is able to carry out these methods.

Computer program means or computer program in the present context include any expression, in any language, code or notation, of a set of instructions intended to cause a system having an information processing capability to perform a particular function either directly or after conversion to another language, code or notation, and/or reproduction in a different material form.

Thus the invention includes an article of manufacture which comprises a computer usable medium having computer readable program code means embodied therein for causing a function described above. The computer readable program code means in the article of manufacture comprises computer readable program code means for causing a computer to effect the steps of a method of this invention. Similarly, the present invention may be implemented as a computer program product comprising a computer usable medium having computer readable program code means embodied therein for causing a a function described above. The computer readable program code means in the computer program product comprising computer readable program code means for causing a computer to effect one or more functions of this invention. Furthermore, the present invention may be implemented as a program storage device readable by machine, tangibly embodying a program of instructions executable by the machine to perform method steps for causing one or more functions of this invention.

It is noted that the foregoing has outlined some of the more pertinent objects and embodiments of the present invention. This invention may be used for many applications. Thus, although the description is made for particular arrangements and methods, the intent and concept of the invention is suitable and applicable to other arrangements and applications. It will be clear to those skilled in the art that modifications to the disclosed embodiments can be effected without departing from the spirit and scope of the invention. The described embodiments ought to be construed to be merely illustrative of some of the more prominent features and applications of the invention. Other beneficial results can be realized by applying the disclosed invention in a different manner or modifying the invention in ways known to those familiar with the art.

We claim:

1. A method comprising:

receiving a request for access to a web portal from a user over a communications network;

determining whether the user is registered for an on-line service providing said user with the web portal through which the user registers with the on-line service via the data communications network and records preferences related to a resource offered by said on-line service through a web browser on the user's device, said web portal coupled with a condition store;

inviting the user to register for access to the on-line service if the user is not registered;

granting the user access to the web portal if the user is registered;

receiving from the user at least one condition associated with the user and related to the resource offered by the on-line service;

receiving from the user a personal preference for issuance of notifications that the at least one condition was met;

storing the at least one condition pertaining to the preferences in the condition store;

responsive to the storing, step, periodically checking whether the at least one condition is satisfied, the at least one condition being implemented in a computer program stored on a server computer system within the data communication network, wherein periodically checking further comprises:

checking whether any one of a plurality of user conditions, prestored in the network, is satisfied, each of the conditions being associated with a different resource accessible via the entry page of the on-line service; and if one or more of the conditions are satisfied, modifying the entry page by adding an indication relating to each corresponding resource and sending the modified entry page to the user;

if the at least one condition is satisfied, modifying the user's entry page to the on-line service by adding a reference to the resource, said reference comprising an indication that enables the user to navigate directly to the resource associated with the satisfied condition, such that the user is able to bypass intervening web pages between the user's entry page and the page where the resource is located;

determining, according to the user's personal preference, whether the user is due to be sent a notification that the condition has been satisfied;

if it is determined that the user is due to be sent the notification, generating the notification to the user;

transmitting the modified entry page to the user upon receipt of the user's access request to the on-line service; and resetting the modified entry page by removing the reference to the resource.

2. A method as claimed in claim 1, wherein the user device is one of a personal computer and mobile telephone, and the indication relating to the resource comprises the resource.

3. A method as claimed in claim 1, wherein the indication relating to the resource comprises a link to the resource.

4. A method as claimed in claim 1, further comprising a step of storing the condition in the network.

5. A method as claimed in claim 1, wherein the indication relating to each corresponding resource comprises the corresponding resource.

6. A method as claimed in claim 1, wherein the indication relating to each corresponding resource comprises a link to the corresponding resource.

7. A method as claimed in claim 1, including storing each condition in the network.

8. A server computer system comprising: a processor; a memory; a bus subsystem interconnecting the central processor unit; and apparatus as claimed in claim 1, connected to the bus subsystem.

9. An article of manufacture comprising a computer readable medium having computer readable program code means embodied therein for causing facilitation of access by a user to a resource of an on-line service, the computer readable program code means in said article of manufacture comprising computer readable program code means for causing a computer to effect the steps of claim 1.

10. A program storage device readable by machine, embodying a program of instructions executable by the machine to perform method steps for facilitating access by a user to a resource of an on-line service, said method steps comprising the steps of claim 1.

11. A computer program storage device readable by computer, embodying a program of instructions executable by the computer to perform method steps comprising the steps of:

receiving a request for access to a web portal from a user over a communications network;

determining whether the user is registered for an on-line service providing said user with the web portal through which the user registers with the on-line service via the data communications network and records preferences related to a resource offered by said on-line service through a web browser on the user's device, said web portal coupled with a condition store;

inviting the user to register for access to the on-line service if the user is not registered;

granting the user access to the web portal if the user is registered;

receiving from the user at least one condition associated with the user and related to the resource offered by the on-line service;

receiving from the user a personal preference for issuance of notifications that the at least one condition was met;

storing the at least one condition pertaining to the preferences in the condition store;

responsive to the storing, step, periodically checking whether the at least one condition is satisfied, the at least one condition being implemented in a computer program stored on a server computer system within the data communication network wherein periodically checking comprises checking whether any one of a plurality of user conditions, prestored in the network, is satisfied, each of the conditions being associated with a different resource accessible via the entry page of the on-line service; and if one or more of the conditions are satisfied, modifying the entry page by adding an indication relating to each corresponding resource and sending the modified entry page to the user;

if the at least one condition is satisfied, modifying the user's entry page to the on-line service by adding a reference to the resource, said reference comprising an indication that enables the user to navigate directly to the resource associated with the satisfied condition, such that the user is able to bypass intervening web pages between the user's entry page and the page where the resource is located;

determining, according to the user's personal preference, whether the user is due to be sent a notification that the condition has been satisfied;

if it is determined that the user is due to be sent the notification, generating the notification to the user, wherein generating the notification comprises transmitting to the user a notification message in response to, and indicative of, each condition being satisfied; and transmitting the modified entry page to the user upon receipt of the user's access request to the on-line service; and resetting the modified entry page by removing the reference to the resource.

12. A server computer system comprising:
a processor;
a memory;
a network adapter for connecting the server system to a data communications network;
a bus subsystem interconnecting the central processor unit; and a computer program element as claimed in claim 11 stored in the memory.

13. An apparatus for facilitating access by a user to a resource of an on-line service, the apparatus comprising:

a memory storing a condition store for storing a user-specified condition related to the resource offered by the on-line service and for storing a personal preference for issuance of notifications that the user-specified condition was met;

a processor reading instructions in memory to operate as a comparator for determining whether the user-specified condition, is satisfied, the user-specified condition being associated with the user, said user-specified condition being implemented in a computer program stored on a server computer system within a data communications network; wherein the comparator further determines whether the user is due to be sent a notification that the condition has been satisfied, wherein the step of periodically checking further comprises:

the processor also reading instructions for checking whether any one of a plurality of user conditions, pre-stored in the network, is satisfied, each of the conditions being associated with a different resource accessible via the entry page of the on-line service; and, if one or more of the conditions are satisfied, modifying the entry page by adding an indication relating to each corresponding resource and sending a modified entry page to the user;

an identifier identifying the user from a service access request submitted by the user over the data communications network;

a page modifier connected to the comparator for modifying the user's entry page by adding an indication relating to the resource if the condition is satisfied, said indication enabling the user to navigate directly to the resource such that the user is able to bypass intervening web pages in the on-line service between the user's entry page and the page where the resource is located; and a message generator connected to the comparator for sending the modified entry page to the user based on the determination by the comparator, wherein the message generator transmits to the user a notification message in response to, and indicative of, each condition being satisfied; and a processor programmed to reset the modified entry page by removing any reference to the resource.

14. An apparatus as claimed in claim 13, wherein the indication relating to the resource comprises the resource.

15. An apparatus as claimed in claim 13, wherein the indication relating to the resource comprises a link to the resource.

16. An apparatus as claimed in claim 13, further comprising the condition store for storing the condition in the network.

17. A computer program product comprising a computer readable storage medium, embodying program code executable by a computer for causing facilitation of access by a user to a resource of an on-line service, the program code in said computer program product for causing a computer to effect the functions of claim 13.

* * * * *